US011334730B2

(12) United States Patent
Torzilli

(10) Patent No.: US 11,334,730 B2
(45) Date of Patent: May 17, 2022

(54) METHODS AND APPARATUS TO IMAGE OBJECTS USING DOCKED HANDHELD IMAGERS

(71) Applicant: ZEBRA TECHNOLOGIES CORPORATION, Lincolnshire, IL (US)

(72) Inventor: Charles Torzilli, East Northport, NY (US)

(73) Assignee: Zebra Technologies Corporation, Lincolnshire, IL (US)

(*) Notice: Subject to any disclaimer, the term of this patent is extended or adjusted under 35 U.S.C. 154(b) by 0 days.

(21) Appl. No.: 16/774,115

(22) Filed: Jan. 28, 2020

(65) Prior Publication Data
US 2021/0232784 A1    Jul. 29, 2021

(51) Int. Cl.
*G06K 15/12* (2006.01)
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
CPC .......... G06F 3/013; G06F 3/017; G06F 3/005; G06F 30/13; G06Q 10/10; G06Q 10/087; G06T 19/006; G02B 27/017; G02B 27/0093

USPC .......... 235/462.41, 462.45, 472.01
See application file for complete search history.

(56) References Cited

U.S. PATENT DOCUMENTS

| 8,602,308 | B2* | 12/2013 | He | G06K 7/14 |
| | | | | 235/462.41 |
| 2009/0325554 | A1* | 12/2009 | Reber | G06T 15/503 |
| | | | | 455/414.1 |
| 2010/0217912 | A1* | 8/2010 | Rofougaran | H04M 1/72527 |
| | | | | 710/304 |
| 2015/0102109 | A1 | 4/2015 | Huck | |
| 2017/0193432 | A1* | 7/2017 | Bernhardt | G06K 19/07 |
| 2019/0102519 | A1* | 4/2019 | Durand | A61B 90/94 |

OTHER PUBLICATIONS

Examination Report for Australian Patent Application No. 2020289828 dated Sep. 22, 2021.

* cited by examiner

*Primary Examiner* — Daniel St Cyr
(74) *Attorney, Agent, or Firm* — Yuri Astvatsaturov

(57) ABSTRACT

Methods and apparatus to capture images using docked handheld imagers are disclosed herein. An example imaging system includes a handheld imager configured to capture images; a mount configured to selectively receive the handheld imager; and a button disposed in the mount, the button configured to, when the handheld imager is disposed in the mount and the button actuated, direct the handheld imager to capture an image and, when the handheld imager is not disposed in the mount and the button is actuated, direct the handheld imager to perform a function other than capture of an image.

22 Claims, 4 Drawing Sheets

METHODS AND APPARATUS TO IMAGE OBJECTS USING DOCKED HANDHELD IMAGERS

BACKGROUND

Handheld imagers (e.g., barcode imagers) can be used to capture images when a person pulls a trigger on the handheld imager or in response to a command received from a host. In some instances, a mount includes a paging button that can be actuated by a person to actuate a paging feature of the mount and handheld imager to help locate a misplaced handheld imager.

SUMMARY

Images captured using a handheld imager in handheld mode may be blurry or out of focus due to, for example, movement of the handheld imager during image capture. Handheld imager are often used in a presentation mode in which the handheld imager is docked (e.g., mounted, engaged, secured, etc. a base, a cradle, a mount, etc.) and a trigger of the handheld imager is actuated (pressed, depressed, activated, etc.) by a person. However, manual actuation of a trigger of a handheld imager while it is docked is often difficult or results in blurry or out of focus images because the trigger isn't positioned for use while the handheld imager is docked.

To reduce or eliminate some or all of these, or other problems of conventional handheld imagers, example methods and apparatus to image objects using docked handheld imagers are disclosed. When a disclosed example handheld imager is docked to a mount, i.e., in a presentation mode, a button (e.g., a paging button, a trigger, etc.) of the mount is reused to trigger capture of an image by the handheld imager. Triggering image capture via the button reduces unintended movement of the handheld imager during image capture as it is positioned on a stationary mount. Images of items such as driver licenses, prescriptions, checks and other documents can be taken by placing them in front of the docked handheld imager and actuating the button. In some examples, there is a configured amount of time between button actuation and image capture to allow a person time to position an item to be imaged in front of the handheld imager. In some examples, the button can be actuated according to sequences to configure aspects of the camera in the handheld imager. For example, one sequence can be used to configure a field-of-view, another sequence can be used to configure a shutter release time, and still another sequence can be used to control zoom, etc. In some examples, a sensor of the mount detects the presence of a handheld imager in the mount before the button can be used to trigger image capture. In some examples, a conventional mount and a handheld imager are firmware upgradable to configure a button of the mount to control image capture by the handheld imager when docked.

Example methods, apparatus, and articles of manufacture to image objects using docked handheld imagers are disclosed herein. Further examples and combinations thereof include at least the following.

In an embodiment, the invention is an imaging apparatus including: a handheld imager configured to capture images; a mount configured to selectively receive the handheld imager; and a button disposed in the mount, the button configured to, when the handheld imager is disposed in the mount and the button actuated, direct the handheld imager to capture an image and, when the handheld imager is not disposed in the mount and the button is actuated, direct the handheld imager to perform a function other than capture of an image.

In a variation of this embodiment, the function other than capture of an image includes a paging function.

In a variation of this embodiment and its variations, a processor is disposed in the mount, the processor configured to sense different types of inputs on the button, and to adjust an aspect of the capture of the image based on a sensed type of input.

In a variation of this embodiment and its variation, the aspect of the capture of the image includes a selection between a type of object, and an image capture resolution for the type of object.

In a variation of this embodiment and its variation, the type of the object is at least one of a barcode or a non-barcode object, and the image resolution is a higher resolution for the non-barcode object than for the barcode.

In a variation of this embodiment and its variations, the different types of inputs include at least one of different button actuation durations or different patterns of button actuations.

In another embodiment, the invention is a method of operating an imaging apparatus having a handheld imager and a mount configured to removably receive the handheld imager, the method comprising: sensing whether the handheld imager is received in the mount; when a button disposed in the mount is actuated while the handheld imager is received in the mount, directing the handheld imager to capture an image; and when the button is actuated while the handheld imager is not received in the mount, actuating a location finding function of the handheld imager.

In a variation of this embodiment includes sensing different types of inputs on the button; and adjusting an aspect of the capture of the image based on a sensed type of input.

In a variation of this embodiment and its variations, wherein the different types of inputs include at least one of different button actuation durations or different patterns of button actuations.

In yet embodiment, the invention is a non-transitory computer-readable storage medium comprising instructions that, when executed, cause an imaging apparatus having a handheld imager and a mount configured to removably receive the handheld imager to: sense whether the handheld imager is received in the mount; when a button disposed in the mount is actuated while the handheld imager is received in the mount, direct the handheld imager to capture an image; and when the button is actuated while the handheld imager is not received in the mount, actuate a location finding function of the handheld imager.

In a variation of this embodiment, the storage medium includes further instructions that, when executed, cause the machine to sense different types of inputs on the button; and adjusting an aspect of the capture of the image based on a sensed type of input

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
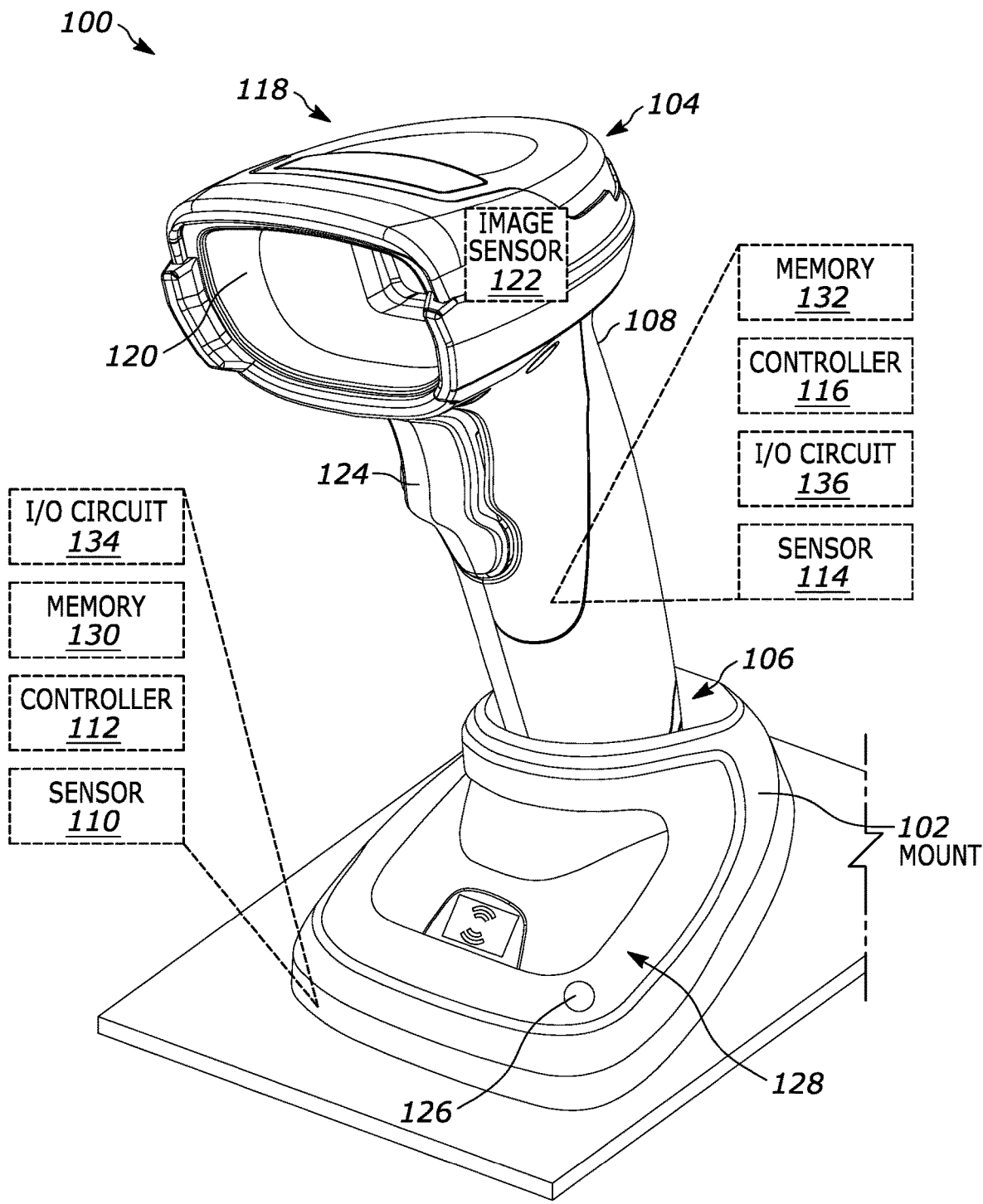
FIG. 1 illustrates an example imaging system in accordance with aspects of the described embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention. In general, the same reference numbers will be used throughout the drawing(s) and accompanying written description to refer to the same or like parts.

The apparatus and method components have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein. Skilled artisans will readily recognize from the following discussion that alternate embodiments of the structures and methods illustrated herein may be employed without departing from the principles set forth herein.

DETAILED DESCRIPTION

Reference will now be made in detail to non-limiting examples, some of which are illustrated in the accompanying drawings.

FIG. 1 illustrates an example imaging apparatus or system 100, in accordance with various embodiments disclosed herein. The imaging system 100 includes a mount 102 (e.g., a base, a dock, a cradle, a receiver, etc.) and a cordless handheld imager 104 that can be used handheld and while docked in the mount 102. At least a portion of the mount 102 is configured to engage (e.g., connect, attach, etc.) a bottom portion 106 of a housing 108 of the handheld imager 104 in a way that reduces potential movement of the handheld imager 104. An example mount 102 includes a receiver (not shown) for physically engaging the bottom portion 106 of the housing 108 of the handheld imager 104. The receiver allows relative movement of the bottom portion 106 between a released position and an engaged or docked position, as shown in FIG. 1, where the handheld imager 104 is maintained in a selectively fixed position. The relative movement may be a translational movement, a rotational movement, etc. For example, the mount 102 may have a translational engagement with the bottom portion 106, where the bottom portion 106 can be translated (or slid) into and out of an engaged position. In some examples, the mount 102 may have rotational engagement, in which the bottom portion 106 can be rotated into and out of the engaged positioned. Such relative movement can provide an added benefit of ensuring that the handheld imager 104 is purposefully located, oriented, etc. while docked. As will be appreciated, other mount 102 configurations allow freer movement of the handheld imager 104. The imaging system 100 may be coupled to a point-of-sale (POS) system, an inventory management system, a machine vision system, etc.

To enable the mount 102 to know whether the handheld imager 104 is docked, the mount 102 includes one or more sensors 110 accessed by a controller 112 in the mount 102 to sense the proximity of the handheld imager 104. Example sensors 110 include, but are not limited to, a Hall sensor, a mechanical switch, a pressure switch, a near-field communication (NFC) sensor, a radio frequency identification (RFID) tag reader, a light sensor, etc. As the bottom portion 106 and the mount 102 are selectively moved into and out of engagement, an output of the sensor 110 processed by the controller 112 changes, thereby, allowing the controller 112 to determine whether the handheld imager 104 is docked to the mount 102.

To enable the handheld imager 104 to know whether the handheld imager 104 is docked, the handheld imager 104 may include one or more sensors 114 accessed by a controller 116 in the handheld imager 104 to sense the proximity of the mount 102. Example sensors 114 include, but are not limited to, a Hall sensor, a mechanical switch, a pressure switch, an NFC sensor, an RFID tag reader, a light sensor, etc. As the bottom portion 106 and the mount 102 are selectively moved into and out of engagement, an output of the sensor 114 processed by the controller 116 changes, thereby, allowing the controller 116 to determine whether the handheld imager 104 is docked to the mount 102. In some examples, when the controller 116 senses the handheld imager 104 is docked it sets up one or more aspects, parameters, etc. of the handheld imager 104 such as starting presentation mode, start charging battery, etc.

To capture images of objects, scan objects, etc., the example handheld imager 104 includes an optical imaging assembly 118, and an imaging window 120. The optical imaging assembly 118 includes an image sensor 122 that includes a plurality of photo-sensitive elements (not shown). The photo-sensitive elements may be arranged in a pattern and may form a substantially flat surface. For example, the photo-sensitive elements may be arranged in a grid or a series of arrays forming a 2D surface. The image sensor 122 of the optical imaging assembly 118 may have an imaging axis that extends through the imaging window 120 for the purpose of capturing 1D or 2D images (e.g., barcodes).

The handheld imager 104 may further include a trigger 124. The trigger 124 is configured to actuate, at least initially, the optical imaging assembly 118 when a person actuates (e.g., pulls, presses, rotates, depresses, etc.) the trigger 124. It is to be understood, however, that actuation of the optical imaging assembly 118 need not occur solely through the trigger 124, and that the handheld imager 104 may also be operated in a hands-free mode where actuation of the optical imaging assembly 118 occurs upon the detection of products, barcodes, etc. in the vicinity, field of view, effective reading range, etc. of handheld imager 104. Additionally, and/or alternatively, the optical imaging assembly 118 may be operated in a hands-free mode controlled by the controller 112 of the mount 102.

The handheld imager 104 includes a controller 116 to control operations of the handheld imager 104. The controller 116 controls the optical imaging assembly 118 to capture images when the trigger 124 is actuated, a command is received from the controller 112, etc. In some examples, the controller 112 configures one or more settings of the optical imaging assembly 118 used to capture images responsive to instructions received from the controller 112. For example, field-of-view, zoom, lighting conditions, shutter release time, etc. may be configured. The controller 116 may also respond to paging or other signals received from the mount 102 while the handheld imager 104 is not docked. In some examples, the controller 112 processes outputs of the optical imaging assembly 118 to detect barcodes, triggers the optical imaging assembly 118 to capture images of the barcodes, and decodes the barcodes.

To enable people to capture images while the handheld imager 104 is docked, the example mount 102 includes a button 126 (e.g., a paging button) or other feature that a person can actuate. In the illustrated example, the button 126 is situated on a top surface 128 of the mount 102. However, the button 126 may be located elsewhere. The button 126 may be a mechanical button, a capacitive touch button, etc. The button 126 can be actuated in different ways (e.g., different sequences of actuations, different duration(s) of actuations, different actuation pressure(s), etc. of the button 126). By actuating the button 126 in different ways a person can control and/or configure various aspects of the imaging system 100.

When the button 126 is actuated while the handheld imager 104 is not docked, i.e., the handheld imager 104 is apart from the mount 102, as detected by the controller 112, the controller 112 actuates a function of the handheld imager 104 other than image capture (e.g., a paging function, a location finding, etc.). However, when the button 126 is actuated while the handheld imager is docked, i.e., the handheld imager 104 is engaged with the mount 102, as detected by the controller 112, the controller 112 controls the handheld imager 104 to capture an image. In some examples, the controller 112 detects sequences of actuations, duration(s) of actuations, actuation pressure(s), etc. of the button 126, configures one or more settings of the optical imaging assembly 118 used to capture images based on how the button 126 was actuated. For example, field-of-view, zoom, lighting conditions, image type (e.g., a barcode, a non-barcode object such as a driver license, etc.), resolution (e.g., lower resolution images for barcodes, higher resolution images for other more detailed items than a barcode such as a driver license, etc.), shutter release time, etc. may be configured. In some examples, the button 126 can be actuated to lock the handheld imager 104 in an image capture mode, in a video capture mode, etc. In such a mode, the handheld imager 104 automatically captures images as, for example, barcodes are detected. The mount 102 could control the handheld imager 104 via any number and/or type(s) of communication technologies including, but not limited to, wireless, wired, NFC, universal serial bus (USB), etc.

The example controllers 112, 116 may be a programmable processor, a programmable controller, a graphics processing unit (GPU), a digital signal processor (DSP), etc. programmed to implement the controllers 112, 116. Alternatively, an application specific integrated circuit (ASIC), a programmable logic device (PLD), a field programmable gate array (FPGA), a field programmable logic device (FPLD), a logic circuit, etc.) may be structured or configured to implement the controllers 112, 116.

The mount 102 and the handheld imager 104 include respective memories 130, 132 to store software, logic and/or computer-readable instructions that may be executed by the controllers 112, 116. Example memories 130, 132 include any number or type(s) of non-transitory computer-readable storage medium or disk, such as a hard disk drive (HDD), an optical storage drive, a solid-state storage device, a solid-state drive (SSD), a read-only memory (ROM), a random-access memory (RAM), a compact disc (CD), a compact disc read-only memory (CD-ROM), a digital versatile disk (DVD), a Blu-ray disk, a cache, a flash memory, or any other storage device or storage disk in which information may be stored for any duration (e.g., permanently, for an extended time period, for a brief instance, for temporarily buffering, for caching of the information, etc.).

The mount 102 and the handheld imager 104 include respective input/output (I/O) circuits 134, 136 to couple the controllers 112, 116 to, among possibly other elements, the sensor 110, the optical imaging assembly 118, the image sensor 122, the button 126, etc.

While an example imaging system 100 is shown in FIG. 1, one or more of the elements, processes, components, devices, etc. illustrated in FIG. 1 may be combined, divided, re-arranged, omitted, eliminated or implemented in any other way. Further, the imaging system 100 may include one or more elements, processes, components, devices, etc. in addition to, or instead of, those illustrated in FIG. 1, or may include more than one of any or all of the illustrated elements, processes, components, devices, etc.

The mount 102 and/or the handheld imager 104 of FIG. 1 may be implemented by hardware, software, firmware, and/or any combination of hardware, software and/or firmware. Thus, for example, any of the mount 102, the handheld imager 104 and/or, more generally, the imaging system 100 of FIG. 1 could be implemented by a computing system such as that shown and discussed below in connection with FIG. 4, one or more of analog or digital circuit(s), logic circuits, programmable processor(s), programmable controller(s), GPU(s), DSP(s), ASIC(s), PLD(s), FPGA(s), and/or FPLD (s).

Figure 2:
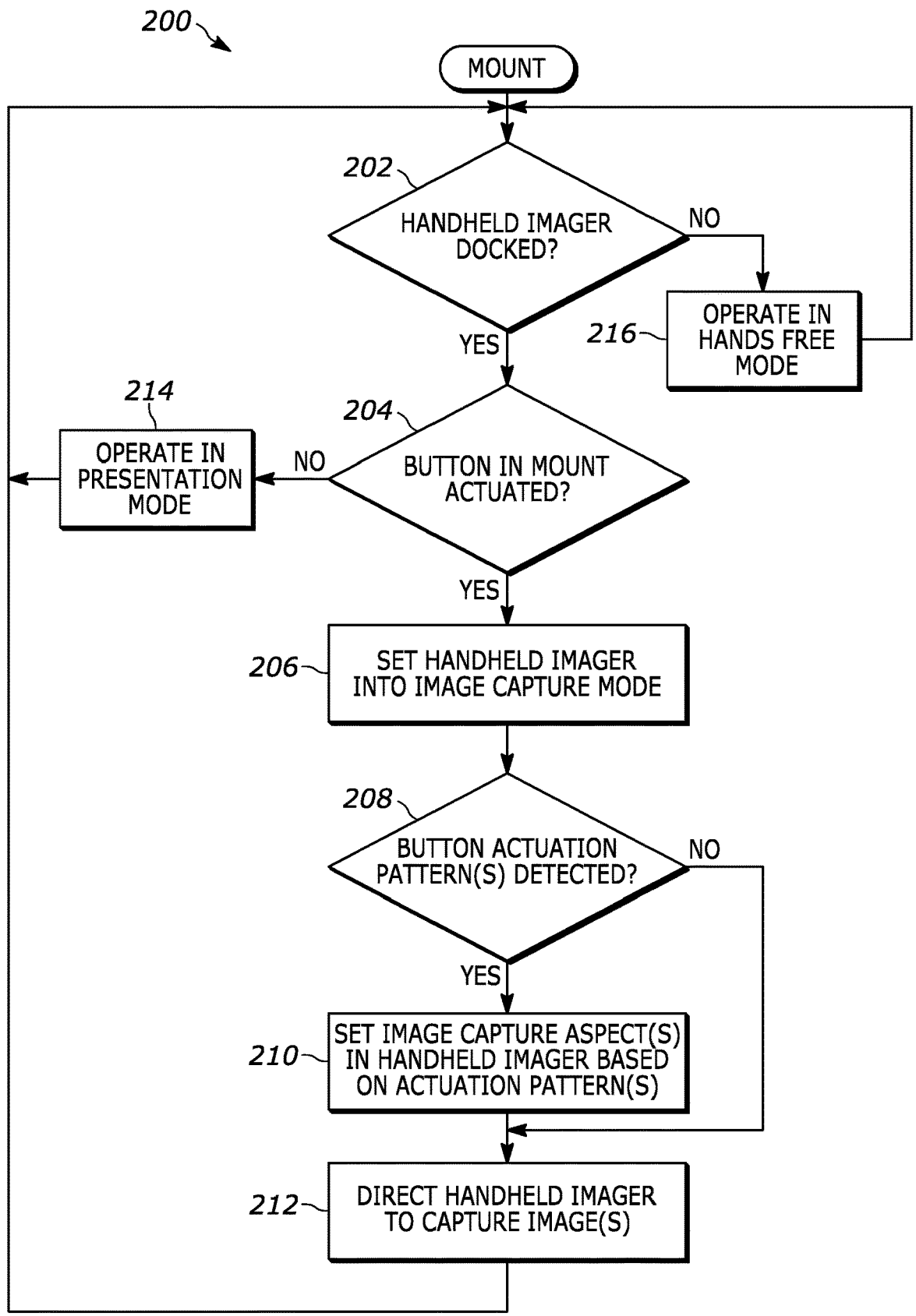
FIG. 2 is a flowchart representative of example methods, logic or machine-readable instructions for implementing the example mount of FIG. 1, in accordance with aspects of the described embodiments.

A flowchart 200 representative of example processes, methods, logic, software, computer- or machine-readable instructions for implementing the mount 102 is shown in FIG. 2. The processes, methods, logic, software and instructions may be an executable program or portion of an executable program for execution by a processor such as the processor 402 of FIG. 4. The program may be embodied in software or instructions stored on a non-transitory computer- or machine-readable storage device, storage medium and/or storage disk such as a memory, a CD, a compact disc read-only memory CD-ROM, a hard drive, an SSD, a DVD, a Blu-ray disk, a cache, a flash memory, a ROM, a RAM, or any other storage device, medium or storage disk associated with the processor 402 in which information is stored for any duration (e.g., for extended time periods, permanently, for brief instances, for temporarily buffering, and/or for caching of the information). Further, although the example program is described with reference to the flowchart 200 illustrated in FIG. 2, many other methods of implementing the mount 102 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

The program of FIG. 2 begins at block 202, where a mount 102 (e.g., the controller 112 of the mount 102) determines whether the handheld imager 104 is docked (block 202). If the handheld imager 104 is docked (block 202) and the button 126 has been actuated (block 204), the mount 102 sets the handheld imager 104 in an image capture mode (block 206) thereby allowing the mount 102 to control the handheld imager 104 to capture images. If the button 126 was actuated with a particular pattern associated with image capture aspects (block 208), the mount 102 configures the handheld imager 104 accordingly (block 210). The mount 102 directs the handheld imager 104 to capture an image (block 212). In some examples, the handheld imager 104 transfers the image to, for example, a POS system, an inventory management system, a machine vision system, etc. In other examples, the handheld imager 104 transfers the image to the mount 102 for further handling. Control then returns to block 202 to check whether the handheld imager 104 is docked.

Returning to block 204, if the button 126 has not been actuated (block 204), the imaging system 100 operates in a presentation mode (block 214). In the presentation mode, as objects (e.g., barcodes) are placed in front of the optical imaging assembly 118 while the handheld imager 104 is docked, the handheld imager 104 captures an image.

Returning to block 202, if the handheld imager 104 is not docked (block 202), the imaging system 100 operates in a hands free mode (block 216). In the hands free mode, as the trigger 124 is actuated the handheld imager 104 captures an image of whatever is in front of the optical imaging assembly 118.

Figure 3:
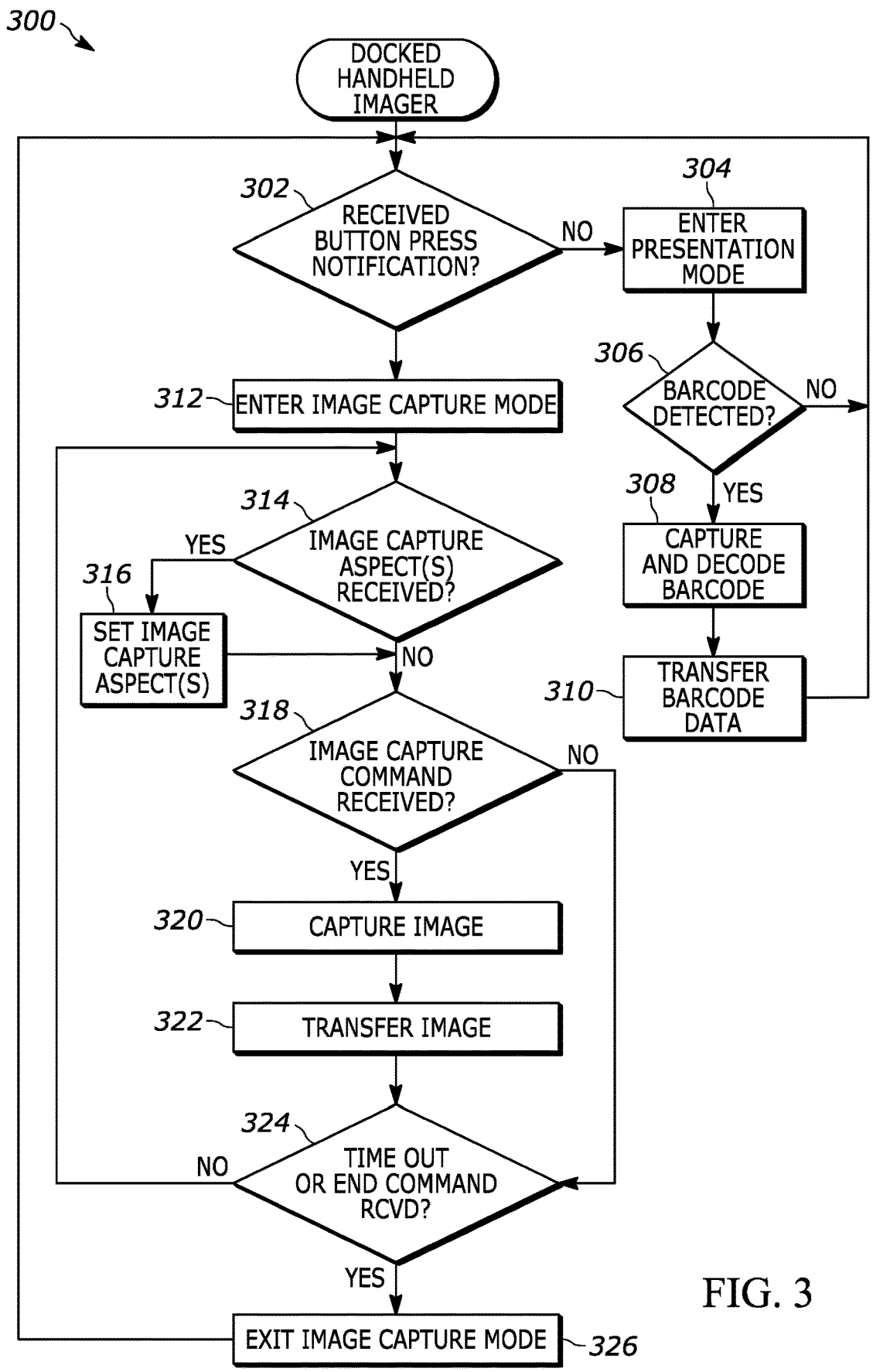
FIG. 3 is a flowchart representative of example methods, logic or machine-readable instructions for implementing the example handheld imager of FIG. 1, in accordance with aspects of the described embodiments.

A flowchart 300 representative of example processes, methods, logic, software, computer- or machine-readable instructions for implementing the handheld imager 104 is shown in FIG. 3 while it is docked. The processes, methods, logic, software and instructions may be an executable program or portion of an executable program for execution by a processor such as the processor 402 of FIG. 4. The program may be embodied in software or instructions stored on a non-transitory computer- or machine-readable storage device, storage medium and/or storage disk such as those described above in connection with FIG. 2. Further, although the example program is described with reference to the flowchart 300 illustrated in FIG. 3, many other methods of implementing the handheld imager 104 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, hardware logic, hardware implemented state machines, etc.) structured to perform the corresponding operation without executing software or instructions.

The program of FIG. 3 begins at block 320, where a docked handheld imager 104 (e.g., the controller 116 of the handheld imager 104) determines whether a notification that the button 126 has been actuated has been received (block 302). If not (block 302), the handheld imager 104 enters a presentation mode (block 304). In the presentation mode, as barcodes are placed in front of the optical imaging assembly 118 of the handheld imager 104, the handheld imager 104 captures (e.g., reads) and decodes the barcode (block 308). The handheld imager 104 transfers the decoded barcode data to, for example, a POS system, an inventory management system, a machine vision system, the mount 102, etc. (block 310). Control then returns to block 302 to determine whether a notification that the button 126 has been actuated has been received (block 302).

Returning to block 302, if a notification that the button 126 has been actuated has been received (block 302), the handheld imager 104 enters an image capture mode (block 312) thereby allowing the mount 102 to control the handheld imager 104 to capture images. If the button 126 was actuated with a particular pattern associated with image capture aspects (block 314), the mount 102 configures the handheld imager 104 accordingly (block 316). When the mount 102 directs the handheld imager 104 to capture an image (block 318), the handheld imager 104 captures an image (block 320) and transfers the image (block 322) to, for example, a POS system, an inventory management system, a machine vision system, etc. In other examples, the handheld imager 104 transfers the image to the mount 102 for further handling. In some examples, the handheld imager 104 remains in the image capture mode until, for example, a timeout occurs or an end command is received (block 324). When a timeout occurs or an end command is received (block 324), the handheld imager 104 exits the image capture mode (block 326).

While the examples of FIGS. 2 and 3 include the detection and handling of barcodes, such functionality may be omitted.

Figure 4:
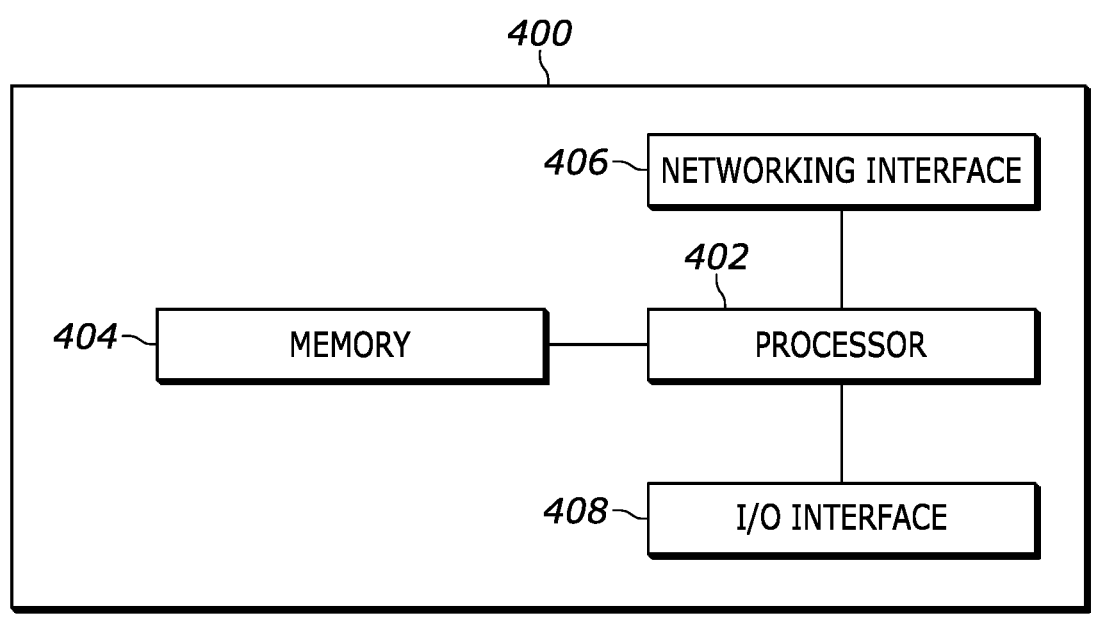
FIG. 4 is a block diagram of an example logic circuit to implement the example methods, apparatus, logic and/or operations described herein.

FIG. 4 is a block diagram representative of an example logic circuit capable of implementing, for example, one or more components of the example mount 102, the example handheld imager 104 of FIG. 1 or, more generally, the example imaging system 100. The example logic circuit of FIG. 4 is a processing platform 400 capable of executing instructions to, for example, implement operations of the example methods described herein, as may be represented by the flowcharts of the drawings that accompany this description. Other example logic circuits capable of, for example, implementing operations of the example methods described herein include FPGAs and ASICs.

The example processing platform 400 of FIG. 4 includes a processor 402 such as, for example, one or more microprocessors, controllers, and/or any suitable type of processor. The example processing platform 400 of FIG. 4 includes memory (e.g., volatile memory, non-volatile memory) 404 accessible by the processor 402 (e.g., via a memory controller). The example processor 402 interacts with the memory 404 to obtain, for example, machine-readable instructions stored in the memory 404 corresponding to, for example, the operations represented by the flowcharts of this disclosure. Additionally or alternatively, machine-readable instructions corresponding to the example operations described herein may be stored on one or more removable media (e.g., a CD, a DVD, removable flash memory, etc.) that may be coupled to the processing platform 400 to provide access to the machine-readable instructions stored thereon. The machine-readable instructions may be executed by the processor 402 to implement the example mount 102, the example handheld imager 104 of FIG. 1 or, more generally, the example imaging system 100.

The example processing platform 400 of FIG. 4 also includes a network interface 406 to enable communication with other machines via, for example, one or more networks. The example network interface 406 includes any suitable type of communication interface(s) (e.g., wired and/or wireless interfaces) configured to operate in accordance with any suitable protocol(s).

The example, processing platform 400 of FIG. 4 also includes input/output (I/O) interfaces 408 to enable receipt of user input and communication of output data to the user.

Although FIG. 4 depicts the I/O interfaces 408 as a single block, the I/O interfaces 408 may include a number of different types of I/O circuits or components that enable the processor 402 to communicate with peripheral I/O devices. Example interfaces 408 include an Ethernet interface, a universal serial bus (USB), a Bluetooth® interface, a near field communication (NFC) interface, and/or a PCI Express interface. The peripheral I/O devices may be any desired type of I/O device such as a keyboard, a display (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more DSPs, one or more ASICs, one or more FPGAs, one or more MCUs, one or more hardware accelerators, one or more special-purpose computer chips, and one or more SoC devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. An imaging apparatus, the apparatus comprising: a handheld imager configured to operate in one of an image capture mode and a presentation mode, the image capture mode being different from the presentation mode; a mount configured to selectively receive the handheld imager; and a button disposed in the mount, wherein: responsive to the handheld imager being disposed in the mount and the button being actuated, the handheld imager is directed to operate in the image capture mode; responsive to the handheld imager being disposed in the mount and the button not being actuated, the handheld imager is directed to operate in the presentation mode; and responsive to the handheld imager not being disposed in the mount and the button being actuated, the handheld imager is directed to operate in a paging mode.

2. The imaging apparatus of claim 1, wherein the paging mode includes a paging function.

3. The imaging apparatus of claim 1, further including a sensor docked in the mount, the sensor configured to sense a presence of the handheld imager in the mount.

4. The imaging apparatus of claim 1, further including a processor disposed in the mount, the processor configured to sense different types of inputs on the button, and to adjust an aspect of the image capture mode based on a sensed type of input.

5. The imaging apparatus of claim 4, wherein the aspect of the image capture mode includes a selection between a type of object, and an image capture resolution for the type of object.

6. The imaging apparatus of claim 5, wherein the type of the object is at least one of a barcode or a non-barcode object, and the image resolution is a higher resolution for the non-barcode object than for the barcode.

7. The imaging apparatus of claim 4, wherein the different types of inputs include at least one of different button actuation durations or different patterns of button actuations.

8. The imaging apparatus of claim 1, further comprising a trigger disposed in the handheld imager, the trigger configured to trigger capture of an image.

9. The imaging apparatus of claim 1, further including a processor disposed in the handheld imager, the processor configured to sense a barcode and, when the barcode is sensed, capture an image of the barcode, and decode the barcode.

10. The imaging apparatus of claim 1, further including: a processor; and a non-transitory computer-readable storage medium storing instructions that, when executed by the processor, cause the processor to modify instructions stored in the non-transitory computer-readable storage medium to enable the image capture mode when the handheld imager is disposed in the mount and the button is actuated.

11. A method of operating an imaging apparatus having a handheld imager operable to alternately operate in one of an image capture mode and a presentation mode, and a mount configured to removably receive the handheld imager, the method comprising:
sensing whether the handheld imager is received in the mount;
when the handheld imager is disposed in the mount and the button is actuated, directing the hand held imager to operate in the image capture mode: when the handheld imager is disposed in the mount and the button is not actuated, directing the handheld imager to operate in the presentation mode; and when the handheld imager is not disposed in the mount and the button is actuated, directing the handheld imager to operate in a paging mode.

12. The method of claim 11, further including receiving a signal from a sensor disposed in the mount, the signal representing whether the handheld imager is received in the mount.

13. The method of claim 11, further including sensing different types of inputs on the button; and adjusting an aspect of the image capture based on a sensed type of input.

14. The method of claim 13, wherein the different types of inputs include at least one of different button actuation durations or different patterns of button actuations.

15. The method of claim 11, further comprising capturing an image when a trigger disposed in the handheld imager is actuated.

16. The method of claim 11, further comprising, when a barcode is sensed, capturing an image of the barcode, and decoding the barcode.

17. The method of claim 11, further comprising modifying instructions stored in a non-transitory computer-readable storage medium to enable the image capture when the handheld imager is received in the mount and the button is actuated.

18. A non-transitory computer-readable storage medium comprising instructions that, when executed, cause an imaging apparatus having a handheld imager and a mount configured to removably receive the handheld imager to:
sense whether the handheld imager is received in the mount;
when the handheld imager is disposed in the mount and the button is actuated, directing the hand held imager to operate in the image capture mode;
when the handheld imager is disposed in the mount and the button is not actuated, directing the handheld imager to operate in the presentation mode; and
when the handheld imager is not disposed in the mount and the button is actuated, directing the handheld imager to operate in a paging mode.

19. The non-transitory computer-readable storage medium of claim 18, including further instructions that, when executed, cause the imaging apparatus to receive a signal from a sensor disposed in the mount, the signal representing whether the handheld imager is received in the mount.

20. The non-transitory computer-readable storage medium of claim 18, including further instructions that, when executed, cause the imaging apparatus to sense different types of inputs on the button; and adjusting an aspect of the capture of the image based on a sensed type of input.

21. The non-transitory computer-readable storage medium of claim 18, including further instructions that, when executed, cause the imaging apparatus to capture an image when a trigger disposed in the handheld wager is actuated.

22. The non-transitory computer-readable storage medium of claim 18, including further instructions that, when executed, cause the imaging apparatus to enable the capture of the image by the imaging apparatus when the handheld imager is received in the mount and the button is actuated.

\* \* \* \* \*